Patented Nov. 12, 1929

1,735,547

UNITED STATES PATENT OFFICE

JAMES H. REEL, OF JACKSON HEIGHTS, AND HAROLD E. CUDE, OF FLORAL PARK, NEW YORK, ASSIGNORS TO THE NAUGATUCK CHEMICAL COMPANY, OF NAUGATUCK, CONNECTICUT, A CORPORATION OF CONNECTICUT

MANUFACTURE OF RUBBER COMPOSITIONS AND PRODUCTS OBTAINED THEREBY

No Drawing.    Application filed May 23, 1927.   Serial No. 193,724.

In recent years there has been considerable progress in the direct use of natural rubber latex in the manufacturing arts. During the course of this development it became necessary to modify certain of the properties of rubber latex and to impart special properties by the addition of ingredients which are generally known as compounding materials. Inasmuch as many of these materials exhibit a coagulating tendency, it has been proposed to add such troublesome ingredients in the form of suspensions or emulsions in water containing a protective colloid. Several attempts have been made to prepare artificial rubber latices, following methods which are quite similar to those employed for incorporating various compounding materials in natural rubber latex. These artificial latices comprise rubber or its solutions dispersed in water containing a hydrophylic protective agent. Generally speaking, all of these compositions, whether they be based upon the positions, whether they be based upon the use of natural latex or upon the use of an artificially prepared latex, are dispersions in which water is the continuous phase, and where the protective agent has a greater affinity for the water than for the dispersed material.

According to the present invention, an entirely different type of dispersion may be prepared, and one which has certain unique properties not possessed by natural latex with or without compounding ingredients. In the present invention rubber-containing dispersions are prepared as water in oil emulsions, in which the protective agent has a greater affinity for the oil than for the water, and the latter is dispersed in the oil. Such dispersions have the characteristic property of being reversible upon change of the solubility of the protective agent. They may be converted into the oil in water type, and back to the water in oil type as desired.

One object of the present invention is to prepare a new type of rubber dispersion in which water is the discontinuous phase, and which may be changed, so as to make the water the continuous phase, leaving the rubber in the dispersed phase. Another object is to prepare a new type of artificial latex. A further object is to furnish means for securing an increased efficiency from special compounding ingredients such as those added to natural or artificial rubber latex, to increase adhesiveness and other properties. Other objects will be apparent from the following description and claims:

The invention comprises preparing a dispersion containing rubber, water and oil in the presence of an emulsifying agent which has a greater affinity for oil than for water. The invention may also include preforming an emulsion of water-in-oil prior to the introduction of the rubber. It is also within the scope of the invention to effect a subsequent step of reversal of the dispersion by reacting on the emulsifying agent to reverse its affinity with respect to oil and water, and causing the dispersion to change from the water-in-oil type to the oil-in-water type.

In one method of carrying out the invention, 100 parts by weight of water are emulsified in 15 parts by weight of spindle oil containing 5 parts of stearic acid. This emulsion may be formed by adding melted stearic acid to the oil and then stirring in the water, maintaining the temperature at say 130°–150° F., or sufficiently high to keep the stearic acid from solidifying. The emulsion is quite fluid while warm, but becomes stiff when cool, part of the water separating if the emulsion be allowed to stand for some time. The emulsion consists of a continuous oil phase and a discontinuous water phase. The emulsion while still warm and fluid or after it has cooled even to the point where part of the water begins to separate, may now be placed in a mixing apparatus, such as a closed mixer having rotating blades, for example a Werner-Pfleiderer mixer of the type employed in the rubber industry. 100 parts of pale crepe, preferably well masticated or softened on the mill are now introduced into the mixer, which is maintained at 150-200° F. and the mixing operation continued until a smooth uniform product is obtained in which the rubber is no longer visible in lumps. The length of time required to complete the dispersion will depend somewhat upon the type of mixer, but the operation may be carried to completeness within two or three hours. If the mixer be of sturdy construction less time will be required and the rubber need not be previously masticated.

Having completed the incorporation of the rubber in the water in oil emulsion, the product appears as a thick viscous dough-like composition. With the above proportions the product is inclined to be sticky, resembling in many respects a stiff dough of the type customarily employed in the manufacture of spread goods. If the above dispersion be treated with sufficient alkali, (such as sodium hydroxide in solution) to combine with the stearic acid, the dispersion speedily reverses its type to form an oil in water type, where the water has now become the continuous phase leaving the rubber dispersed. This reversal of type is accompanied by a change in some of the properties, and particularly the adhesive properties. Instead of being a sticky product, it has now become smooth, velvety, and resembling concentrated latex. If the amount of alkali be neutralized, that is if the stearic acid be liberated again as such or if the soluble stearate be converted into an insoluble stearate, the dispersion again reverses, and once more becomes the sticky water in oil type.

It is not necessary to disperse the water in the oil prior to the introduction of the rubber, but this is one way of carrying out the invention. It makes no difference whether the preformed emulsion is uniform or not in texture, paste-like or fluid, or whether it has started to "break" before the rubber is introduced. The same kind of product may be obtained when the rubber, water, emulsifying agent and oil are simultaneously introduced into the mixer.

As another illustration of the invention, 100 parts of water are emulsified with 5 parts of mineral oil, with 5 parts of melted stearic acid as the emulsifying agent. This emulsion may be made up in the mixer or may be stirred together and poured into the mixer which is maintained at say 150° to 200° F. 100 parts of well masticated or softened pale crepe are now introduced into the mixer, preferably in small pieces or strips. The mixer is rotated until the rubber is no longer visible in lumps, and the mixing continued for a short time thereafter. The mixer may then be cooled somewhat if desired in order to remove the dispersion. During the dispersing operation, the temperature of the mixer is ordinarily maintained sufficiently high by the heat generated in the mixing operation, and it is therefore not usually necessary to supply heat throughout the entire dispersing operation. The time required to complete the dispersion will vary somewhat as in the previous example, but ordinarily two to three hours, or thereabouts, will be sufficient. This dispersion may if desired be reversed in the same manner as previously described.

A dispersion containing 100 parts of mineral oil, 90 parts of water, 5 parts of oleic acid and 100 parts of reclaimed rubber may be made by introducing all of these ingredients into the warmed mixer at once and rotating the blades. The reclaimed rubber may be previously softened on a mixing mill. After the dispersion is complete, a small quantity of caustic soda solution containing approximately 1.5 parts of caustic soda calculated as dry material, may be introduced into the mixer while the latter is still in operation. The sticky dispersion very quickly changes its texture and becomes more smooth and somewhat less viscous. The addition of the caustic soda causes the dispersion to reverse from the water in oil type to the oil in water type, for the sodium oleate, which is formed in the mixer, has the property of emulsifying oil in water. The reversing step is not essential, and may be omitted.

As another example, an emulsion of 400 water and 100 of pine tar is prepared. This emulsion is of the water in oil type, inasmuch as the pine tar contains saponifiable acids having a greater affinity for oil than for water. 200 parts of reclaimed rubber may be incorporated with this emulsion according to the procedure outlined in the previous examples. If desired, the dispersion thus produced may be reversed by the addition of four parts of caustic soda in solution. Similarly dispersions can also be made with animal and vegetable oils, for example:—100 reclaim, 20 neat's-foot oil, 100 water, 5 lanolin; or 100 reclaim, 20 palm oil (or corn oil), 100 water, 5 oleic acid.

Compositions of the kind described above may be made with the several types of raw rubber, for example smoked sheet, pale crepe, sprayed rubbers, the softer grades such as guayule, caucho, and also reclaimed rubber, although in the latter instance it is sometimes necessary to make provision for the compounding ingredients which form a part of the reclaim. Other mineral or vegetable oils including seed oils may be employed, and of course varying proportions of oil and water may be used. Rubber-containing dispersions may be made with 100 water to 5 of oil or 5 of water to 100 of oil, as well as with proportions of water and oil intermediate of these figures. Where the proportion of oil is as low as 5 to 100 of water, the emulsion is usually quite coarse and unstable when cool, but this does not interfere with the practice of the invention nor with the success of the product. The proportion of rubber may also be varied, but good results may be obtained with approximately equal parts of rubber and water. Among the protective agents which give water in oil emulsions may be listed the higher saponifiable acids, such as stearic, oleic, palmitic, abietic, undecylenic, resin acids, pine tars, pine pitches, rosin, insoluble heavy metal soaps, lanolin, gum dammar, water insoluble stearates, oleates, resinates, etc. Reversing agents include the alkalies, where free acid protective agents are employed, and salts having the property of converting the insoluble soaps and resinates into soluble soaps and resinates. For example, an aluminum soap may be changed to a soluble soap by treatment with an excess of alkali or of a salt which hydrolyzes to give a strongly basic reaction.

The products made according to the present invention may be used directly, that is as rubber-containing water in oil dispersions, in substantially the same manner as it is now customary to employ rubber-solvent doughs in the manufacture of spread or coated fabrics. As one specific illustration the compositions containing the oil and the tars or pitches as protective agents have excellent adhesive properties and are suitable for the manufacture of friction tapes. These compositions may be diluted readily by the addition of oil. Further attenuation may also be accomplished by the introduction of additional quantities of a water in oil emulsion. As stated above the composition has improved adhesive properties, and the specific materials ordinarily introduced to impart adhesiveness, etc. such as tars, sticky resins, and the like may be introduced into the above dispersions during their manufacture, and they will show an increased efficiency for the purpose intended, as compared with the existing methods in which the adhesive agent is dispresed in water containing a hydrophylic protective agent. In the present invention the dispersed particles or droplets of the adhesive agent are not coated with a protective material having little or no adhesive properties. Compounding and/or vulcanizing ingredients may be introduced into the dispersion at any convenient time, and the composition may be vulcanized as desired.

When the original dispersion, that is the water in oil type, has been reversed by the addition of alkali or by the conversion of the water insoluble protective agent into a water soluble material, the dispersion then is of the oil in water type, in which both the rubber and the oil are discontinuous and the water constitutes the continuous phase. In this state the dispersion may be added to rubber latex or latex may be added to it. The reversed dispersion in which the water constitutes the continuous phase, may be utilized in any and all of the instances in a manner similar to that which natural rubber latex, with or without compounding ingredients, is used in the manufacturing arts. For example, the composition may be spread, coated upon forms or deposited thereon by filtration or electrodeposition. It may be vulcanized prior to or after the manufacture of articles. It may be employed in the manufacture of rubber containing fibrous sheet materials.

One interesting property of these reversible dispersions is that phase reversal can be made to take place locally or in situ. A water in oil composition may be coated upon a fabric or sheet material, taking advantage of the adhesive properties of the composition, and the surface of the coating may be then treated with an alkali, whereby the surface stickiness can be removed by reversing the phases at the surface of the coating.

Similarly reversible dispersions may be prepared by dispersing rubber and oil in water in the presence of a water soluble emulsifying agent which is capable of being converted into a water insoluble compound, and which has the property of forming water in oil emulsions when in the water insoluble form. By way of illustration a dispersion of the oil in water type may be made by mixing rubber and oil with water containing a soluble soap as for instance sodium oleate or other soluble saponifiable material. The resultant dispersion here is of the oil in water type and resembles in many of its properties a natural rubber latex which has been thickened without coagulation. By conversion of the soluble emulsifying agent into an insoluble compound, as for instance converting sodium oleate into magnesium oleate, the reaction taking place within the dispersion, the latter upon further agitation will undergo a phase reversal and the water will be in the dispersed phase.

The invention may also be applied to the compounding of rubber latex with oils and other liquid or semi-liquid ingredients which are water insoluble. According to the prior practice these materials have been emulsified in water in the presence of a hydrophylic colloid, but this practice tends to dull the characteristics which are sought in the introduction of such materials. These materials are for the most part capable of forming water in oil emulsions and are likewise capable of undergoing a phase-reversal upon alteration of the solubility of the emulsifying agent with respect to the water. By way of illustration, water may be emulsified in an oil containing for instance resin acid to form a grease-like product comprising a water in oil emulsion. This emulsion may be reversed by the addition of sufficient amount of sodium hydroxide or other alkali to form sodium resinate in the emulsion. Upon continued agitation the emulsion reverses its phases and the oil becomes dispersed in the water. In this state it may, with or without dilution, be added to rubber latex. Upon removal of part of the water, the oily property begins to assert itself and the composition becomes more sticky than a composition with the same amount of oil introduced as an oil in water emulsion with glue, saponin, or other emulsifying agents which are not capable of undergoing an alteration in their solubility with respect to water.

The expression "oil" as used in the specification and claims signifies those true oils, mineral, animal and vegetable, and includes as well those materials which are fluid or liquid at ordinary temperatures or at somewhat elevated temperatures, and have the property of forming both water in oil and oil in water types of emulsions. The term "rubber" is generic to any type of raw or reclaimed rubber or rubber-like substance or mixtures of these. Solubility and insolubility as used in the specification and claims are understood to include true solubility as well as what is understood in the art as colloidal solubility.

Having thus described our invention, what we claim and desire to protect by Letters Patent is:

1. A process for preparing rubber compositions which comprises forming a water-in-oil emulsion and incorporating rubber therein.

2. A process for preparing rubber compositions which comprises emulsifying water in oil in the presence of a water-in-oil type of emulsifying agent, and agitating rubber therewith until uniformly disseminated therethrough.

3. A process for preparing rubber compositions which comprises emulsifying water in a hydrocarbon oil containing a water insoluble saponifiable emulsifying agent, and agitating rubber therewith until uniformly disseminated therethrough.

4. A process for preparing rubber compositions which comprises emulsifying water in a mineral oil containing a water insoluble saponifiable emulsifying agent, and incorporating rubber therein.

5. A process for preparing rubber compositions which comprises forming a relatively stiff emulsion of water in a mineral oil containing a water insoluble saponifiable emulsifying agent, and agitating raw rubber therewith and add until uniformly disseminated therethrough.

6. A process for preparing rubber compositions which comprises forming an emulsion of water in a spindle oil containing stearic acid and incorporating rubber therein.

7. A process for preparing rubber compositions which comprises forming a relatively stiff emulsion of water in a medium spindle oil containing a water insoluble soap forming aliphatic acid, and incorporating rubber therein.

8. A process for preparing rubber compositions which comprises forming a relatively stiff emulsion of water in a medium spindle oil containing stearic acid, and agitating raw rubber therewith until uniformly disseminated therethrough.

9. A process for preparing rubber compositions which comprises agitating water, oil, and rubber in the presence of a water insoluble emulsifying agent until a uniform dispersion is obtained, converting the insoluble emulsifying agent into a water soluble emulsifying agent by treatment with an alkali, and agitating the composition until a reversal of phase with respect to the water takes place.

10. A process for preparing phase-reversible rubber compositions which comprises agitating water, oil, rubber and a water insoluble soap as emulsifying agent until a uniform dispersion is obtained, converting the insoluble soap into water soluble form by treatment with alkali, and agitating until a reversal of phases with respect to the water takes place.

11. A process for preparing phase-reversible rubber compositions which comprises forming a dispersion of water in oil in the presence of a water in oil emulsifying agent, incorporating rubber in the dispersion, converting said emulsifying agent into an oil in water type by treatment with an alkali to change its solubility with respect to water, and agitating until the dispersion reverses its phases.

12. In a process for preparing phase-reversible rubber compositions of the type comprising rubber, water, oil and an emulsifying agent, the step of reversing the phases in said composition by adding an alkaline material thereby altering the solubility of the emulsifying agent with respect to the oil and water.

13. A new method of introducing into a rubber latex water insoluble ingredients of the kind capable of forming water in oil emulsions which comprises dispersing water in said ingredients in the presence of a water insoluble emulsifying agent to form a water in oil emulsion, reversing the emulsion to an oil in water emulsion by adding an alkaline material thereby altering the solubility of the emulsifying agent with respect to the water, and adding said reversed emulsion into a rubber latex.

14. A process for preparing rubber compositions which consists in dispersing water in oil, and then agitating the dispersed water in oil with rubber.

15. A process for preparing rubber compositions which consists in dispersing water in oil, then agitating the dispersed water in oil with rubber and subsequently treating with an alkali to reverse the dispersion and obtain an oil and rubber dispersion in water.

Signed at New York, county and State of New York, this 16th day of May, 1927.

JAMES H. REEL.

Signed at New York, county and State of New York, this 13th day of May, 1927.

HAROLD E. CUDE.

CERTIFICATE OF CORRECTION.

Patent No. 1,735,547.   Granted November 12, 1929, to

JAMES H. REEL ET AL.

It is hereby certified that error appears in the printed specification of the above numbered patent requiring correction as follows: Page 1, line 54, strike out the word "rubber"; page 4, line 57, claim 5, strike out the words "and add"; and that the said Letters Patent should be read with these corrections therein that the same may conform to the record of the case in the Patent Office.

Signed and sealed this 1st day of April, A. D. 1930.

(Seal)

M. J. Moore,
Acting Commissioner of Patents.